United States Patent
Cho

(10) Patent No.: US 9,917,290 B2
(45) Date of Patent: Mar. 13, 2018

(54) BATTERY MODULE HAVING HOLDER

(71) Applicant: SAMSUNG SDI CO., LTD., Yongin-si (KR)

(72) Inventor: Man-Sik Cho, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 561 days.

(21) Appl. No.: 14/465,648

(22) Filed: Aug. 21, 2014

(65) Prior Publication Data
US 2015/0086834 A1  Mar. 26, 2015

(30) Foreign Application Priority Data

Sep. 23, 2013  (KR) ................ 10-2013-0112752

(51) Int. Cl.
*H01M 2/04* (2006.01)
*H01M 2/20* (2006.01)

(52) U.S. Cl.
CPC ......... *H01M 2/206* (2013.01); *H01M 2/204* (2013.01)

(58) Field of Classification Search
None
See application file for complete search history.

(56) References Cited

U.S. PATENT DOCUMENTS

| 2004/0142233 A1 | 7/2004 | Park et al. |
| 2013/0196204 A1 * | 8/2013 | Song ............... H01M 2/204 429/99 |

FOREIGN PATENT DOCUMENTS

| EP | 2284928 A2 * | 2/2011 | ........... H01M 2/105 |
| KR | 10-2004-0039611 A | 5/2004 | |
| KR | 10-2012-0081821 A | 7/2012 | |
| KR | 10-2012-0090828 A | 8/2012 | |

* cited by examiner

*Primary Examiner* — Tracy Dove
(74) *Attorney, Agent, or Firm* — Knobbe Martens Olson & Bear LLP

(57) ABSTRACT

A battery module according to an exemplary embodiment of the present invention includes a plurality of rechargeable batteries having a terminal, a holder combined to end portions of the rechargeable batteries and having a first fastening portion, and a bus bar combined to the terminal, electrically connecting the rechargeable batteries, and having a second fastening portion to be fitted into the first fastening portion.

16 Claims, 7 Drawing Sheets

BATTERY MODULE HAVING HOLDER

CROSS-REFERENCE TO RELATED APPLICATIONS

This application claims priority to and the benefit of Korean Patent Application No. 10-2013-0112752 filed in the Korean Intellectual Property Office on Sep. 23, 2013, the entire contents of which are incorporated herein by reference.

BACKGROUND

Field

The described technology relates generally to a battery module. More particularly, the described technology relates generally to a battery module having an improved holder structure to support rechargeable batteries.

Description of the Related Technology

A rechargeable battery differs from a primary battery in that it can be repeatedly charged and discharged, while the latter is incapable of being recharged.

A low-capacity rechargeable battery is used in small portable electronic devices such as mobile phones, notebook computers, and camcorders, while a high-capacity rechargeable battery can be widely used as a power source for driving a motor of a hybrid vehicle, an electric vehicle, and the like.

In addition, a high-capacity battery module normally includes a plurality of rechargeable batteries connected in series, and a rechargeable battery may be formed in a cylindrical or prismatic shape.

The battery module is provided with a bus bar to electrically connect rechargeable batteries.

The bus bar is welded to a terminal of the rechargeable batteries, and welding is performed while the bus bar is aligned above the rechargeable batteries.

A jig and the like are used to locate the bus bar at a correct position, but this kind of work consumes a lot of time and involves complex manufacturing processes.

In addition, locating the bus bar at a correct position is very difficult even if the jig is used.

When external impacts or vibrations are delivered to the battery module, electrical contact failure between the bus bar and the terminal may occur.

If contact failure occurs between the bus bar and the terminal, output power not only decreases as resistance increases, but also heat is generated, thereby resulting in performance deterioration and a shortened life expectancy of the rechargeable battery.

The above information disclosed in this Background section is only for enhancement of understanding of the background of the described technology and therefore it may contain information that does not form the prior art that is already known in this country to a person of ordinary skill in the art.

SUMMARY OF CERTAIN INVENTIVE ASPECTS

Accordingly, the present invention has been made in an effort to solve the problem described above, thus the purpose of the present invention is to provide a battery module which can easily and correctly align a bus bar.

Another purpose of the present invention is to provide the battery module which can prevent contact failure between a bus bar and a terminal.

The battery module according to an exemplary embodiment includes a plurality of rechargeable batteries having a terminal and edge portions, a holder combined to end portions of the rechargeable batteries and provided with a first fastening portion, and a bus bar bonded to the terminal, electrically connecting the rechargeable batteries, and having a second fastening portion to be connected with the first fastening portion.

The first fastening portion may be fitted into the second fastening portion, and may be provided with a supporting protrusion formed in the holder, while the second fastening portion may be provided with a supporting hole which is formed in the bus bar and fitted into the supporting protrusion.

The first fastening portion may be provided with a supporting groove, the second fastening portion may be provided with a supporting protrusion which is formed in the bus bar and fitted into the supporting groove, a protecting member covering the bus bar is provided therein, and the bus bar may be disposed between the protecting member and the holder. The protecting member may be formed with a third fastening portion to be fitted into the first fastening portion, and may be provided with tape attached to the bus bar.

The holder may be provided with a first hole into which an end portion of one rechargeable battery is inserted, a second hole into which an end portion of another rechargeable battery neighboring the first one is inserted, and an upper plate partially covering the first and second holes, and the upper plate may be provided with the first fastening portion.

The first fastening portion may be provided with a supporting rib protruding from the holder, and the second fastening portion may be provided with a cut-out portion which is formed in the bus bar and fitted into the supporting rib.

The upper plate may be provided with a mounting groove connected to the first and second holes, the bus bar includes first and second connection portions and the connecting portion disposed between the first and second connection portions, and the mounting groove may be inserted with the first connection portion, the second connection portion, and the connecting portion.

Two first connection portions disposed apart from each other are formed to be connected at one end portion of the connecting portion, two second connection portions disposed apart from each other are formed to be connected at the opposite end portion of the connecting portion, and the two first connection portions may be welded to one rechargeable battery and the two second connection portions may be welded to another rechargeable battery neighboring the first one.

The bus bar includes a first supporting portion protruding from the first connection portion, formed in a curved shape, and contacting the upper plate, and the first supporting portion may be provided with the second fastening portion.

The bus bar is provided with a second supporting portion protruding from the second connection portion, formed in a curved shape, and contacting the upper plate, the second supporting portion may be provided with the second fastening portion, and the first and second connection portions may be provided with a bonding protrusion protruding towards the rechargeable battery and being welded thereto.

According to the present invention, since the holder and the bus bar are combined together, the bus bar can be easily and correctly disposed at a predetermined position, and contact between the bus bar and the terminal can be favorably maintained by preventing the bus bar from being shaken.

DETAILED DESCRIPTION OF CERTAIN INVENTIVE EMBODIMENTS

Figure 1:
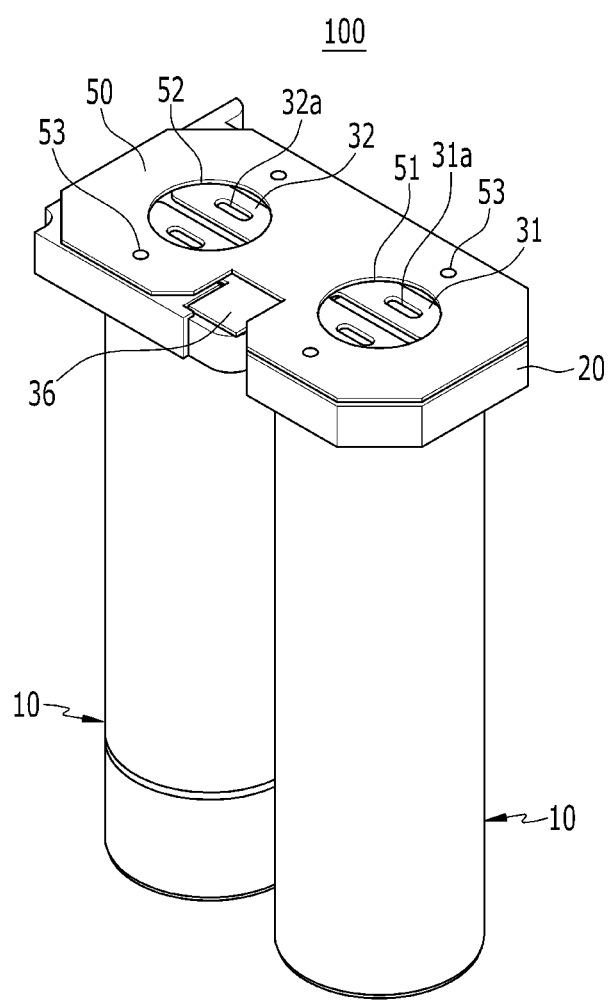
FIG. 1 is a perspective view of a battery module according to a first exemplary embodiment of the present invention.

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

Like reference numerals designate like elements throughout the specification and the drawings.

Figure 2:
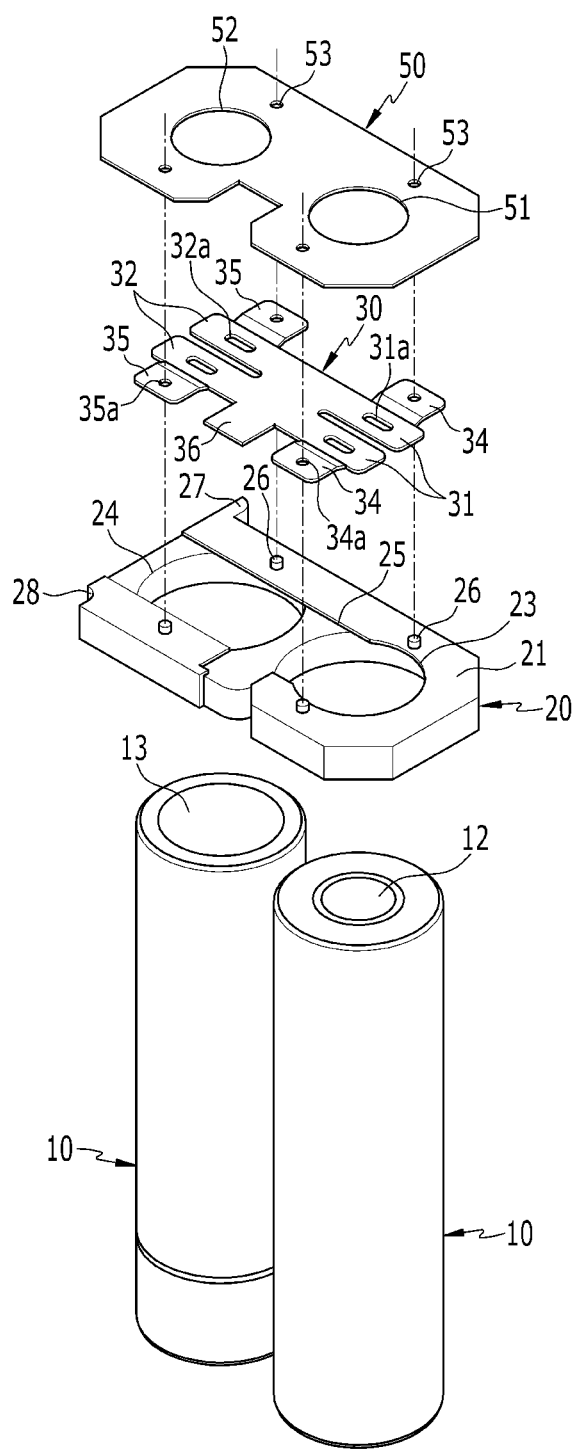
FIG. 2 is an exploded perspective view of the battery module according to the first exemplary embodiment of the present invention.

FIG. 1 is a perspective view of a battery module according to a first exemplary embodiment of the present invention, and FIG. 2 is an exploded perspective view of the battery module according to the first exemplary embodiment of the present invention.

Referring to FIG. 1 and FIG. 2, the battery module 100 includes a plurality of rechargeable batteries 10, a holder 20 to fix the rechargeable batteries 10, and a bus bar 30 electrically connecting the rechargeable batteries 10.

The rechargeable battery 10 is formed in a cylindrical shape, and includes a case, an electrode assembly inserted into the case and having a positive electrode and a negative electrode, a cap plate combined to an opening of the case, and a terminal protruding out of the case.

The rechargeable battery according to the present exemplary embodiment is exemplarily illustrated as a cylindrical lithium ion rechargeable battery, but the present invention is not limited thereto, and it may be formed in a prismatic shape or any other shapes.

The rechargeable battery 10 is connected in series with a neighboring rechargeable battery 10 through the bus bar 30.

However, the present invention is not limited thereto, and the rechargeable batteries can be freely connected in series or in parallel.

The rechargeable batteries 10 formed in a cylindrical shape are disposed with their top and bottom sides alternately arranged.

A positive terminal 12 is disposed at an end portion of the rechargeable battery 10 in a height direction thereof, while a negative terminal 13 is disposed at the opposite end of the rechargeable battery 10 in a height direction thereof.

One rechargeable battery 10 is disposed with its positive terminal located at an upper portion, and another rechargeable battery 10 is disposed with its negative terminal located at an upper portion.

The holder 20 is combined to one end portion of the rechargeable batteries 10 in a length direction thereof such that it is combined to different end portions of neighboring rechargeable batteries 10 in a length direction thereof.

That is, the holder 20 is combined to an end portion of the rechargeable battery 10 at one side where the positive terminal 12 is located, and is combined to an opposite end portion of the neighboring rechargeable battery 10 where the negative terminal 13 is located.

Figure 3:
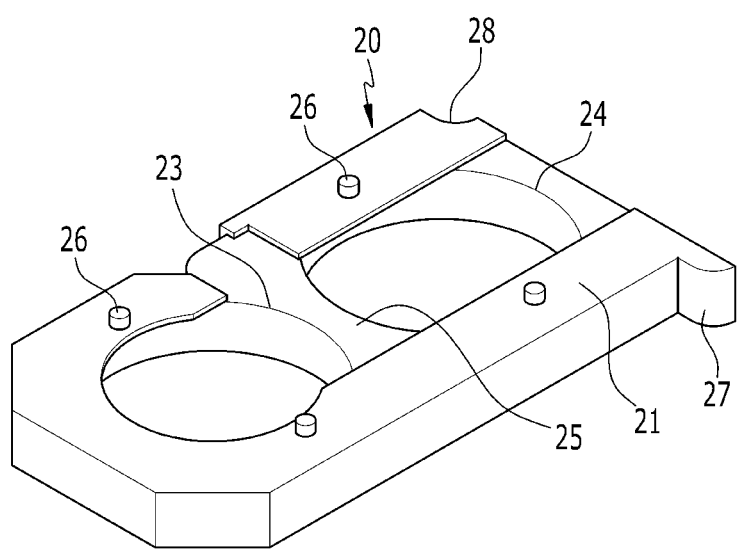
FIG. 3 is a perspective view of a holder of the battery module according to the first exemplary embodiment of the present invention.

As shown, for example, in FIG. 3, the holder 20 is formed with a first hole 23 into which the end portion of one rechargeable battery 10 is inserted, and a second hole 24 which is disposed apart from the first hole 23 and inserted with an end portion of another rechargeable battery 10.

In addition, the holder 20 is formed with an upper plate 21 partially covering the first and second holes 23 and 24, and a mounting groove 25 connected to the first and second holes 23 and 24 is formed in the upper plate 21.

The upper plate 21 supports the end portions of the rechargeable batteries 10 by partially covering the first and second holes 23 and 24.

The mounting groove 25 is formed at an inner side of the upper plate 21, and is formed to be stepped towards the rechargeable batteries 10.

A plurality of supporting protrusions 26 protrude from the upper plate 21, and the plurality of supporting protrusions 26 are combined with the bus bar 30 to form a first fastening portion.

Two supporting protrusions 26 are formed adjacent to the first hole 23 in the periphery thereof, and two supporting protrusions 26 are formed adjacent to the second hole 24 in the periphery thereof.

Meanwhile, an aligning protrusion 27 is formed at one end portion of the holder 20, and an aligning groove 28 to be combined with the aligning protrusion 27 is formed at the opposite end portion of the holder 20.

Accordingly, neighboring holders 20 can be easily aligned by coupling of the aligning protrusion 27 and the aligning groove 28.

Figure 4:
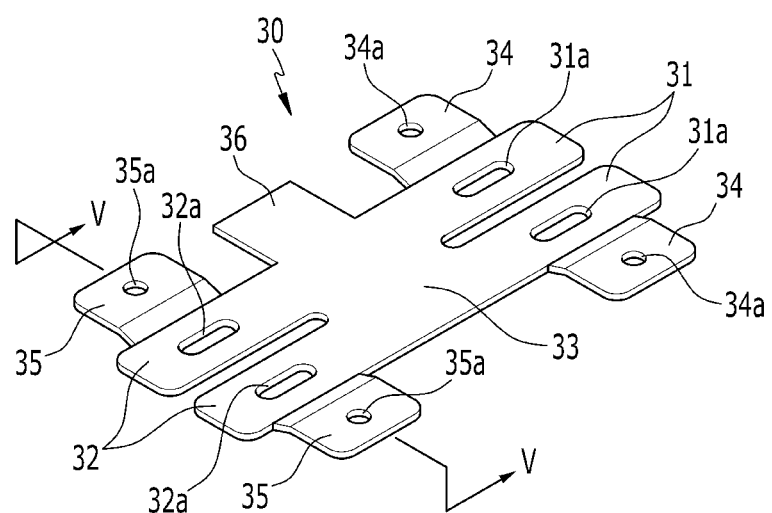
FIG. 4 is a perspective view of the bus bar of the battery module according to the first exemplary embodiment of the present invention.
Figure 5:
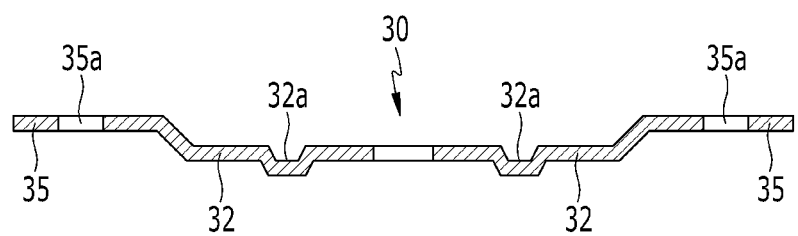
FIG. 5 is a cross-sectional view of FIG. 4, taken along the line V-V.

FIG. 4 is a perspective view of the bus bar of the battery module according to the first exemplary embodiment of the present invention, and FIG. 5 is a cross-sectional view of FIG. 4, taken along the line V-V.

Referring to FIG. 4 and FIG. 5, the bus bar 30 includes first connection portions 31 connected to the positive terminal 12 of one rechargeable battery 10, second connecting portions 32 connected to negative terminal 13 of another rechargeable battery 10 and a central connecting portion 33 disposed between the first and second connecting portions 31 and 32.

The bus bar 30 is made of a conductive metal plate, the first connection portions 31 are disposed at one end portion of the bus bar 30 in a length direction thereof, and the second connection portions 32 are disposed at the opposite end portion of the bus bar 30 in a length direction thereof.

Thus, the first connection portions 31 are connected to one end portion of the connecting portion 33, the second connection portions 32 are connected to the opposite end portion of the connecting portion 33, and the first and second connection portions 31 and 32 are formed to be elongated in respective opposite directions.

The first connection portions 31, the second connection portions 32, and the connecting portion 33 are disposed to be inserted into the mounting groove 25.

The connecting portion 33 is formed with two first connection portions 31 that are elongated, and the two first connection portions 31 are disposed apart from each other.

The first connection portions 31 are respectively provided with a bonding protrusion 31a protruding towards the rechargeable battery 10, and the bonding protrusion 31a is formed in a curved shape.

The bonding protrusion 31a is welded to the terminal of the rechargeable battery 10 such that each bonding protrusion 31a formed in the first connection portion 31 is welded to the terminal of one rechargeable battery 10.

In the present exemplary embodiment, when the two first connection portions 31 disposed apart from each other in the rechargeable battery 10 are bonded together, the second connection portions 32 individually move with elasticity, thereby absorbing or buffering external vibrations.

The battery module 100 may be applied to a power tool, a vehicle, and the like, which generate repeated vibrations.

These vibrations may cause contact failure at the welded part of the first connection portion 31 and the terminal.

This can cause a critical durability problem of the battery module 100, but the first connection portions 31 according to the present exemplary embodiment serve to buffer vibrations, thereby reducing the problem of contact failure.

First supporting portions 34 are respectively formed to protrude outwards from the first connection portions 31. The first supporting portions 34 are bent at the first connection portion 31 and are disposed above the first connection portion 31, and the first supporting portion 34 contacts the upper plate 21. The first supporting portions 34 are formed with supporting holes 34a to be fitted into the supporting protrusion 26, and the second fastening portion is provided with the supporting holes 34a.

Two second connection portions 32 are formed to be elongated in the connecting portion 33, and the two second connection portions 32 are disposed apart from each other.

The second connection portions 32 are respectively formed with a bonding protrusion 32a, and the bonding protrusions 32a are formed in a curved shape.

The bonding protrusions 32a are welded to the terminal of the rechargeable battery 10, and each bonding protrusion 32a is welded to the terminal of one rechargeable battery 10.

Second supporting portions 35 are respectively formed to protrude outwards from the second connection portions 32.

The second supporting portions 35 are bent at the second connection portions 32 and disposed at a different plane therefrom, are disposed above (refer to FIG. 4) the second connection portions 32, and contact the upper plate 21.

The second supporting portions 35 are provided with supporting holes 35a to be fitted into the supporting protrusion 26, and the second fastening portion is provided with the supporting holes 35a.

Meanwhile, a drawn-out terminal 36 is formed to protrude from a lateral end of the connecting portion 33 such that it is electrically connected to the neighboring bus bar 30 or to the terminal installed outside (not shown in FIGS.) and transmits a current.

As shown in FIG. 2, a protecting member 50 covering the bus bar 30 is provided above the bus bar 30, and the bus bar 30 is disposed between the protecting member 50 and the holder 20. The protecting member 50 is formed in a plate shape, and is provided with two openings 51 and 52. The protecting member 50 is made of a polymer having an electrical insulating property. The protecting member 50 is formed with supporting holes 53, and the third fastening portion is provided with the supporting holes 53.

The bus bar 30 is welded to the rechargeable batteries 10 while the protecting member 50 is combined to the holder 20, and welding can be easily performed by contacting welding tools with the bus bar 30 through the openings.

Figure 6:
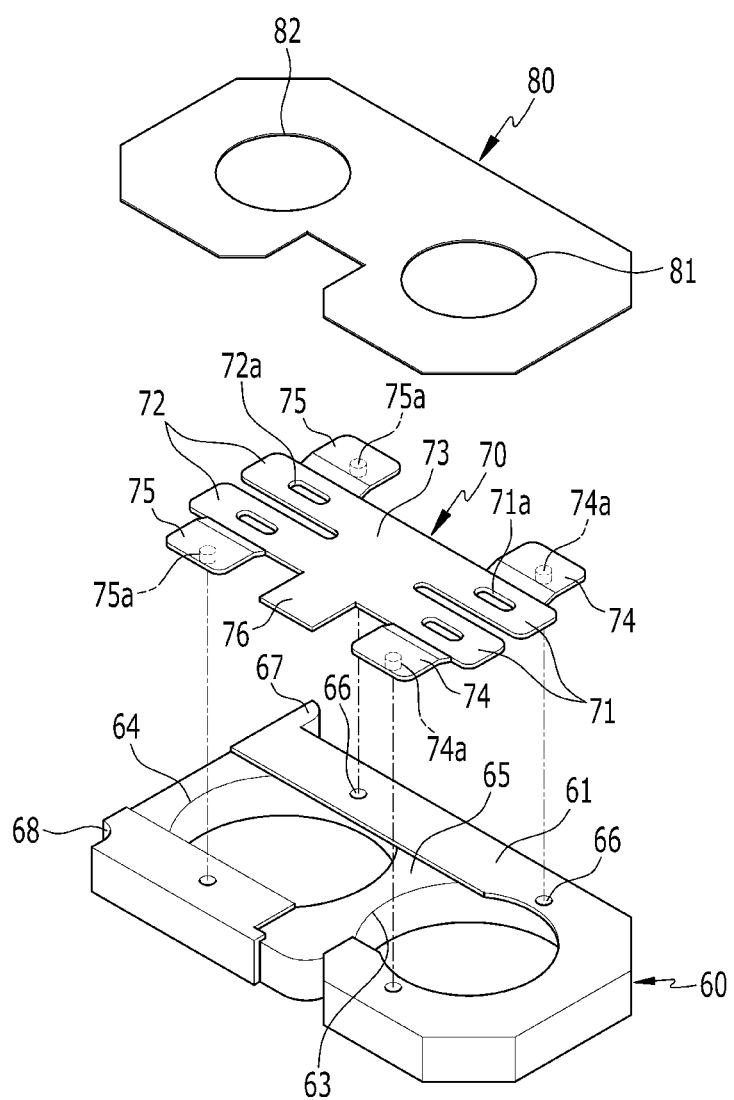
FIG. 6 is an exploded perspective view of a holder and a bus bar according to a second exemplary embodiment of the present invention.

FIG. 6 is an exploded perspective view of a holder and a bus bar according to a second exemplary embodiment of the present invention.

Referring to FIG. 6, since a battery module according to the present exemplary embodiment has the same structure as the battery module according to the first exemplary embodiment, except for a holder 60, a bus bar 70, and a protecting member 80, a repeated description of the same structure will be omitted.

The holder 60 is combined to one end portion of the rechargeable batteries 10 in a length direction thereof such that it is provided with a first hole 63 into which an end portion of one rechargeable battery 10 is inserted and a second hole 64 disposed apart from the first hole 63 and inserted with an end portion of another rechargeable battery 10.

In addition, the holder 60 is formed with an upper plate 61 partially covering the first and second holes 63 and 64, and a mounting groove 65 connected to the first and second holes 63 and 64 is formed in the upper plate 61.

The upper plate 61 is formed with a plurality of supporting grooves 66, and the plurality of supporting grooves 66 are combined with the bus bar 70 to form a first fastening portion.

Meanwhile, an aligning protrusion 67 is formed at one end portion of the holder 60, and an aligning groove 68 to be combined with the aligning protrusion 67 is formed at the opposite end portion of the holder 60.

The bus bar 70 includes first connection portions 71 connected to the terminal of one rechargeable battery 10, second connection portions 72 connected to the terminal of another rechargeable battery 10, and a connecting portion 73 disposed between the first and second connection portions 71 and 72.

The first connection portions 71 are connected to one end portion of the connecting portion 73, the second connection portions 72 are connected to the opposite end portion of the connecting portion 73, and the first and second connection portions 71 and 72 are respectively formed to be elongated in respective opposite directions.

The first connection portions 71, the second connection portions 72, and the connecting portion 73 are disposed to be inserted into the mounting groove 65.

The first connection portions 71 are respectively provided with a bonding protrusion 71a protruding towards the rechargeable batteries 10, and the bonding protrusion 71a is formed in a curved shape.

First supporting portions 74 are respectively formed to protrude outwards from the first connection portions 71.

The first supporting portions 74 are bent at the first connection portions 71 and are disposed above the first connection portion 71, and the first supporting portions 74 contact the upper plate 71.

The first supporting portions 74 are formed with supporting protrusions 74a to be fitted into the supporting groove 66, and a second fastening portion is provided with the supporting protrusion 74a.

Second supporting portions 75 are respectively formed to protrude outwards from the second connection portions 72.

The second supporting portions 75 are bent at the second connection portion 72 and disposed at a different plane therefrom, are disposed above the second connection portion 72, and contact the upper plate 61.

The second supporting portions 75 are provided with supporting protrusions 75a to be fitted into the supporting groove 66, and the second fastening portion is provided with the supporting protrusion 75a.

A drawn-out terminal 76 is formed to protrude from a lateral end of the connecting portion 73 such that it is electrically connected to a neighboring bus bar 70 or to the terminal installed (not shown in FIGS.) and transmits a current.

Figure 7:
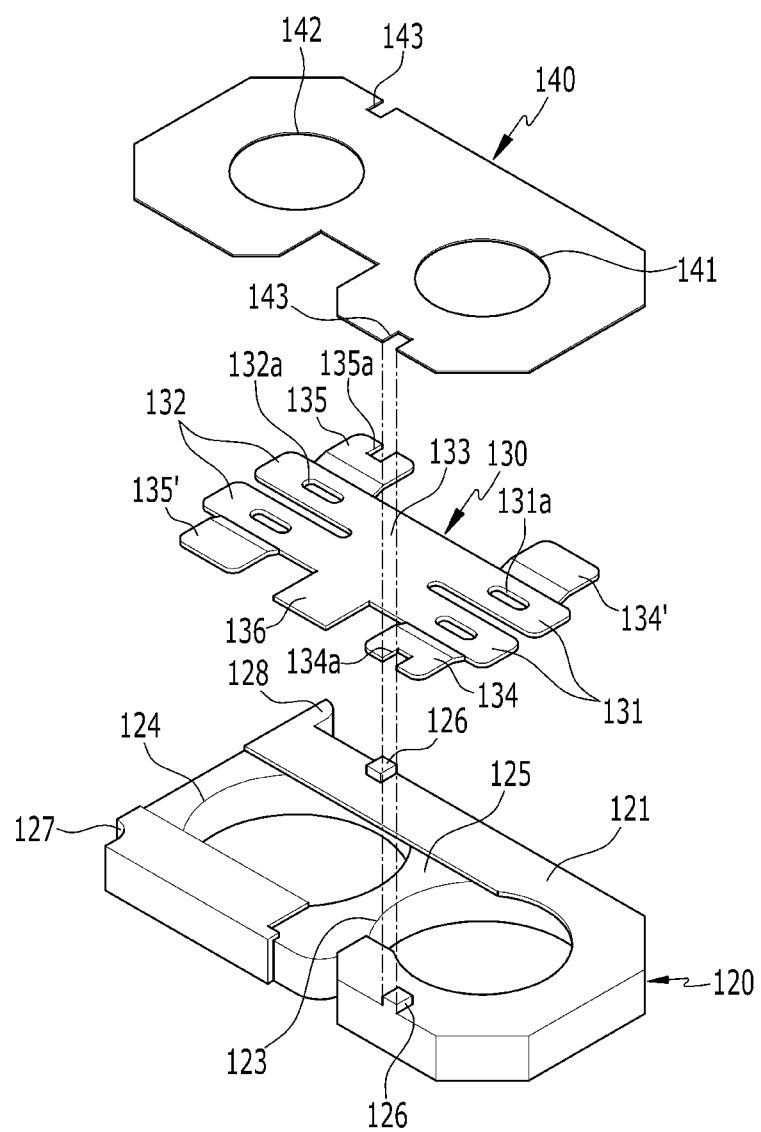
FIG. 7 is an exploded perspective view of a holder and a bus bar according to a third exemplary embodiment of the present invention.

The protection member 80 covering the bus bar 70 is provided above the bus bar 70, and the bus bar 70 is disposed between the protecting member 80 and the holder 60. The protecting member 80 is formed of tape with one side having an adhesive layer, and is bonded to the bus bar 70. Two openings 81 and 82 are formed in the protecting member 80 so as to weld the bus bar 70 and the rechargeable battery 10. FIG. 7 is an exploded perspective view of a holder and a bus bar according to a third exemplary embodiment of the present invention.

Referring to FIG. 7, since a battery module according to the present exemplary embodiment has the same structure as the battery module according to the first exemplary embodiment, except for a holder 120, a bus bar 130, and a protecting member 140, a repeated description of the same structure will be omitted.

The holder 120 is combined to one end portion of one rechargeable battery 10 in a length direction thereof such that it is provided with a first hole 123 into which an end portion of one rechargeable battery 10 is inserted and a second hole 124 disposed apart from the first hole 123 and inserted with an end portion of another rechargeable battery.

In addition, the holder 120 is formed with an upper plate 121 partially covering the first and second holes 123 and 124, and a mounting groove 125 connected to the first and second holes 123 and 124 is formed in the upper plate 121.

The upper plate 121 is formed with a plurality of supporting ribs 126, and the plurality of supporting ribs 126 are combined with the bus bar 130 to form a first fastening portion.

The upper plate 121 is formed with two supporting ribs 126.

One supporting rib 126 is formed close to the first hole 123, and is formed to be elongated towards the first hole 123 from a lateral end of the holder 120.

Another supporting rib 126 is formed close to the second hole 124, and is formed to be elongated towards the second hole 123 from a lateral end of the holder 120.

An aligning protrusion 127 is formed at one end portion of the holder 120, and an aligning groove 128 to be combined with the aligning protrusion 127 is formed at the opposite end portion of the holder 120. The bus bar 130 includes first connection portions 131 connected to the terminal of one rechargeable battery 10, second connection portions 132 connected to the terminal of another rechargeable battery 10, and a connecting portion 133 disposed between the first and second connection portions 131 and 132.

The first connection portions 131 are connected to one end portion of the connecting portion 133, the second connection portions 132 are connected to the opposite end portion of the connecting portion 133, and the first and second connection portions 131 and 132 are respectively formed to be elongated in respective opposite directions.

The first connection portions 131, the second connection portions 132, and the connecting portion 133 are disposed to be inserted into the mounting groove 125. The first connection portions 131 are respectively provided with a bonding protrusion 131a protruding towards the rechargeable battery 10, and the bonding protrusions 131a are formed in a curved shape. First supporting portions 134 and 134' are respectively formed to protrude outwards from the first connection portions 131. The first supporting portions 134 and 134' are bent at the first connection portions 131 and are disposed above the first connection portion 131, and the first supporting portions 134 and 134' contact the upper plate 131.

The first supporting portion 134 is formed with a cut-out portion 134a to be fitted into the supporting rib 126, and the second fastening portion is provided with the cut-out portion 134a.

Second supporting portions 135 and 135' are respectively formed to protrude outwards from the second connection portions 132.

The second supporting portions 135 and 135' are bent at the second connection portion 132 and disposed at a different plane therefrom such that they are disposed above the second connection portions 132 and contact the upper plate 131.

The second supporting portions 135 are provided with a cut-out portion 135a to be fitted into the supporting rib 126, and the second fastening portion is provided with the cut-out portion 135a.

The cut-out portion 134a is formed to be elongated inwards from a lateral end of the first supporting portion 134, and the cut-out portion 135a is formed to be elongated inwards from a lateral end of the second supporting portion 135.

A drawn-out terminal 136 is formed to protrude from a lateral end of the connecting portion 133 that it is electrically connected to a neighboring bus bar 130 or to the terminal provided outside (not shown in FIGS.) and transmits a current.

The protection member 140 covering the bus bar 130 is provided on the bus bar 130, and the bus bar 130 is disposed between the protecting member 140 and the holder 120. The protecting member 140 is made of a plate having an electrical insulating property. The protecting member 140 is provided with two openings 141 and 142 to weld the bus bar 130 and the rechargeable battery 10. The protecting member 140 is formed with a cut-out portion 143, and a third fastening portion is provided with the cut-out portion 143.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A battery module comprising:
a plurality of rechargeable batteries having a terminal and edge portions;
a holder connected to the edge portions of the rechargeable batteries and having a first fastening portion; and
a bus bar bonded to the terminal, electrically connecting the rechargeable batteries, and having a second fastening portion to be connected with the first fastening portion wherein the bus bar includes a connecting portion that is connected to the rechargeable batteries and a supporting portion that extends outward from the connecting portion and is positioned at a vertical level that is higher than a vertical level of the connecting portion and wherein the second fastening portion is formed on the supporting portion.

2. The battery module of claim 1, wherein the first fastening portion is fitted into the second fastening portion.

3. The battery module of claim 2, wherein the first fastening portion is formed with a supporting protrusion formed in the holder, and the second fastening portion is formed in the bus bar and provided with a supporting hole to be fitted into the supporting protrusion.

4. The battery module of claim 2, wherein the first fastening portion is provided with a supporting groove formed in the holder, and the second fastening portion is formed in the bus bar and provided with a supporting protrusion to be fitted into the supporting groove.

5. The battery module of claim 2, wherein a protecting member covering the bus bar is provided on the bus bar, and the bus bar is disposed between the protecting member and the holder.

6. The battery module of claim 5, wherein the protecting member is formed with a third fastening portion to be fitted into the first fastening portion.

7. The battery module of claim 5, wherein the protecting member is formed of tape attached to the bus bar.

8. The battery module of claim 2, wherein the first fastening portion is formed with a supporting rib protruding from the holder, and the second fastening portion is formed in the bus bar and provided with a cutout portion to be fitted into the supporting rib.

9. The battery module of claim 2, wherein the holder is formed with a first hole into which an end portion of one rechargeable battery is inserted, a second hole into which an end portion of another rechargeable battery neighboring the first one is inserted, and an upper plate partially covering the first and second hole.

10. The battery module of claim 9, wherein the first fastening portion is formed in the upper plate.

11. The battery module of claim 10, wherein the upper plate is provided with a mounting groove connected to the first and second holes.

12. The battery module of claim 11, wherein the connecting portion of the bus bar includes a first and second connection portions and a central connecting portion disposed between the first and second connection portions, and the mounting groove is inserted with the first and second connection portions and the connecting portion.

13. The battery module of claim 12, wherein two first connection portions disposed apart from each other are formed to be connected at one end portion of the central connecting portion, two second connection portions disposed apart from each other are formed to be connected to the opposite end of the central connecting portion such that the two first connection portions are welded to one rechargeable battery, and the two second connection portions are welded to another rechargeable battery neighboring the first one.

14. The battery module of claim 12, wherein the bus bar includes first supporting portions protruding from the first connection portions, formed in a curved shape, and contacting the upper plate, and the first supporting portion is provided with the second fastening portion.

15. The battery module of claim 12, wherein the bus bar includes second supporting portions protruding from the second connection portions, formed in a curved shape, and contacting the upper plate, and the second supporting portion is provided with the second fastening portion.

16. The battery module of claim 12, wherein the first and second connection portions are formed with bonding protrusions protruding towards the rechargeable battery and being welded thereto.

* * * * *